UNITED STATES PATENT OFFICE.

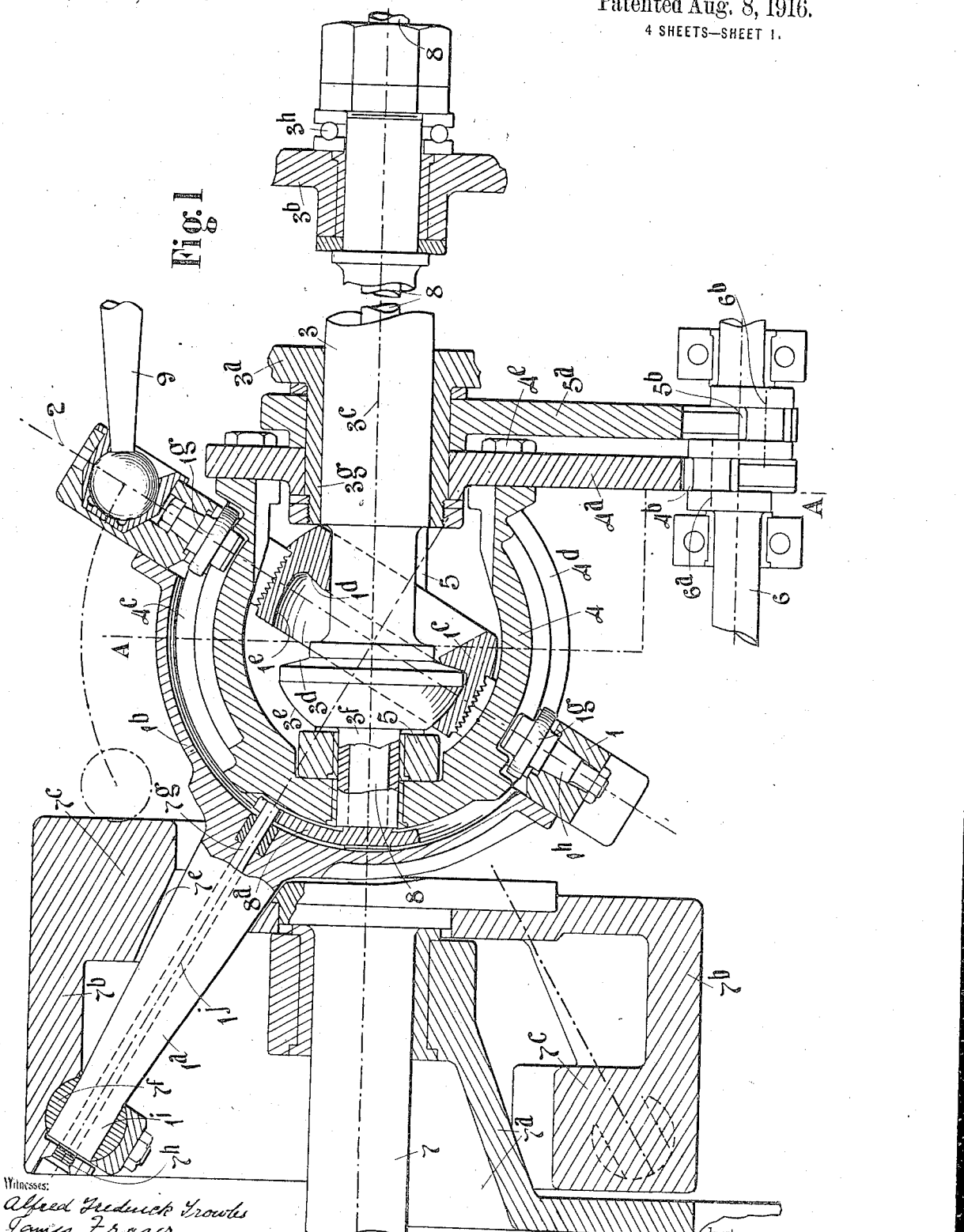

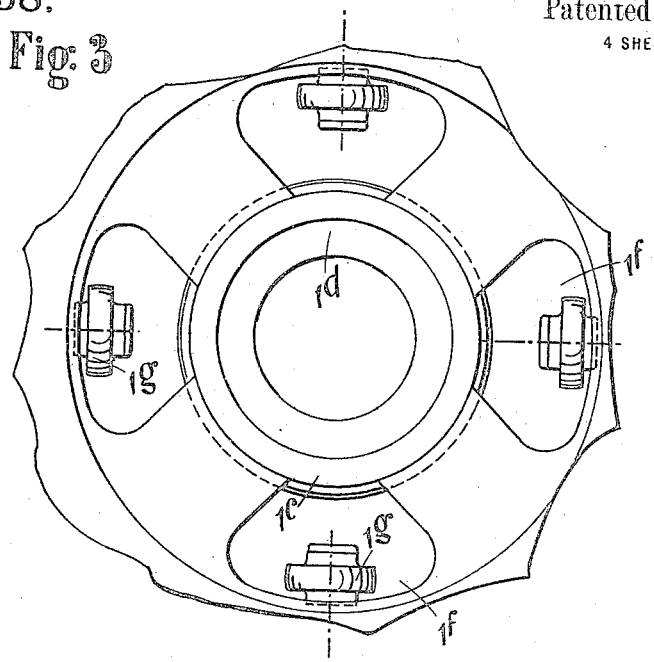
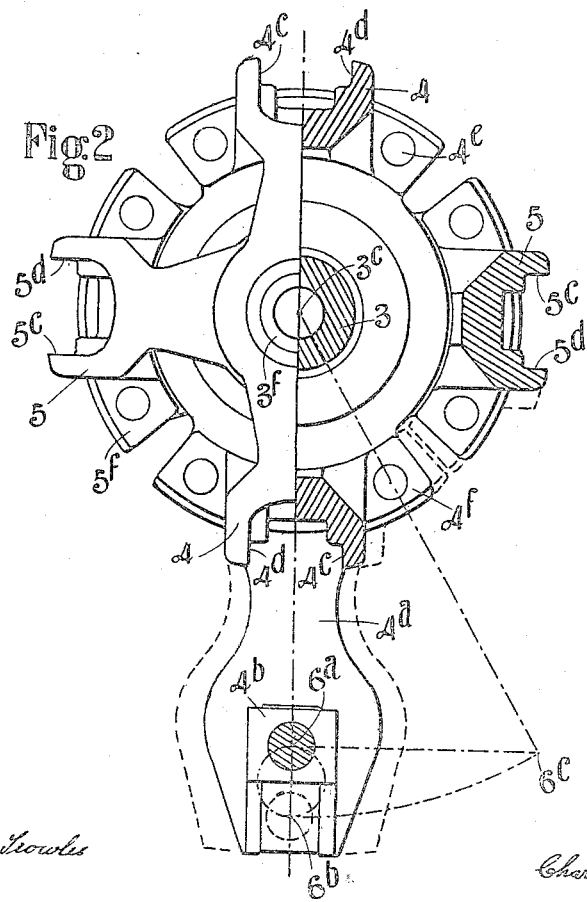

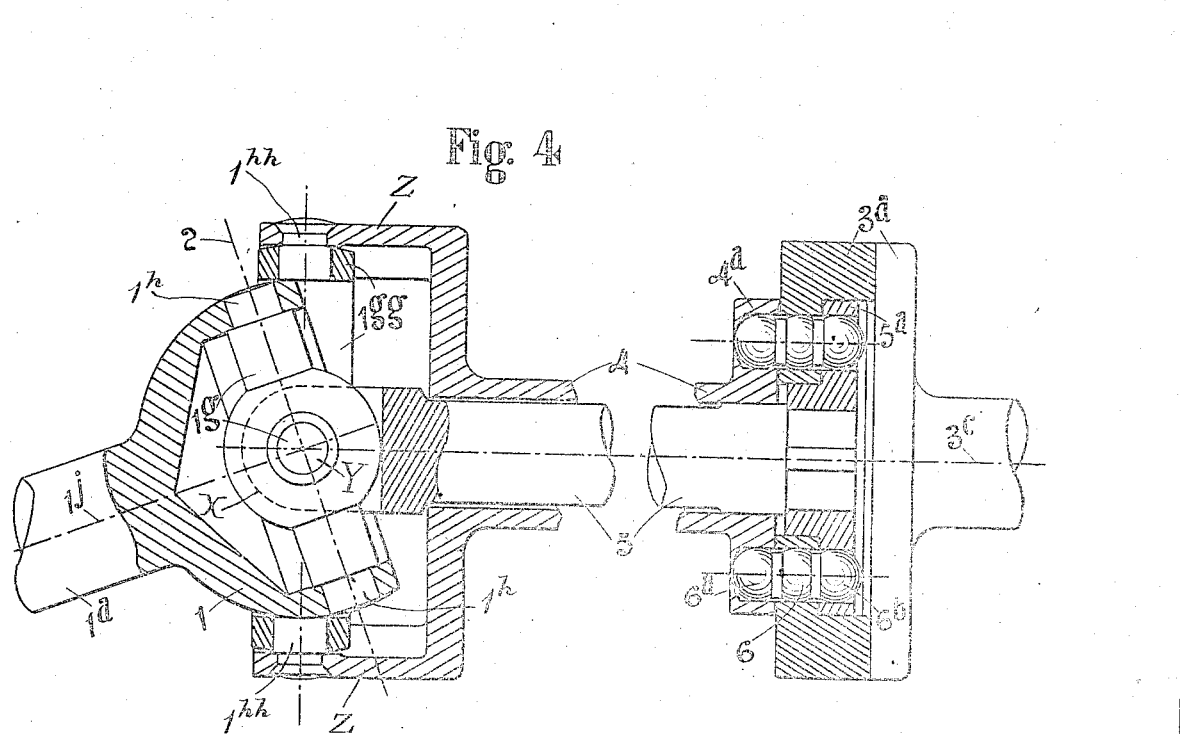

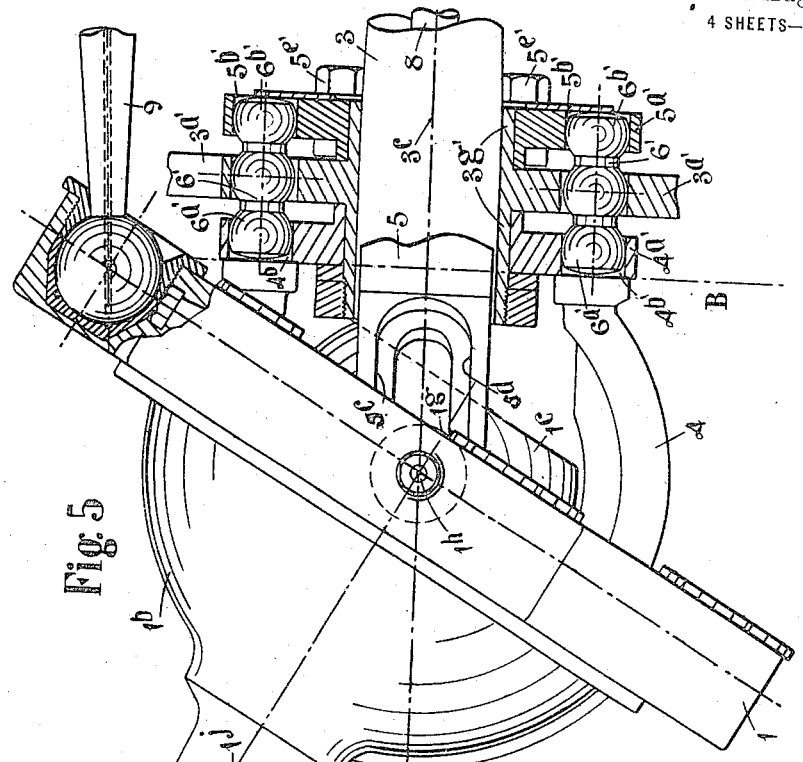
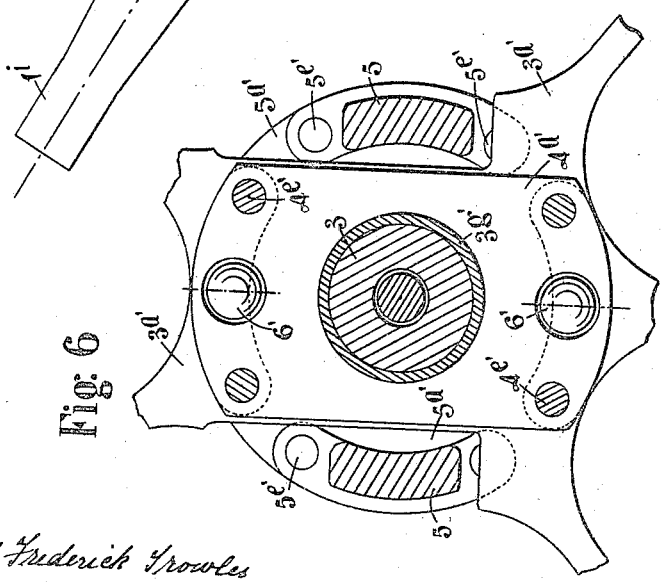

CHARLES LESLIE WALKER, OF HAMPSTEAD, LONDON, ENGLAND.

MECHANICAL MOVEMENT.

1,194,258. Specification of Letters Patent. Patented Aug. 8, 1916.

Application filed May 1, 1915. Serial No. 25,335.

*To all whom it may concern:*

Be it known that I, CHARLES LESLIE WALKER, a subject of the King of Great Britain and Ireland, residing at 38ª Boundary road, Hampstead, London, N. W., England, have invented a new and useful Mechanical Movement Applicable to Axial-Drive Engines, of which the following is a specification.

For the purpose of this specification the expression "medial plane" is to be understood as signifying that plane in a swash-plate, disk inclined member or analogous agent which continually lies at right angles to the axis of such member or agent and cuts both such axis and the axis of the apparatus in one and the same point. The expression "contrary members" is hereinafter used as designating the two main elements in universal joint mechanism; for example, in an engine, the structure which carries the cylinders, etc., and the opposed inclined disk plate or like agent; certain functions or features of the two being sometimes exchangeable.

Though the invention is in part useful generally as an improved mechanical movement in a universal joint, its use is of special importance as a driving mechanism in fluid-pressure engines where the axial thrust between the contrary members must be dealt with and where it is of crucial importance (unless the angle of the inclined contrary member be a small one) that the contrary members shall be so anchored together that the movement of the inclined one shall synchronize with the other. To put this matter strictly, in case where the member carrying the cylinders is stationary the inclined contrary member should not move reciprocatingly about its axis while the latter describes a cone. This want of synchronism, due to incorrect anchorage, has hitherto given rise to the irregularities which are well known to exist in universal-joint mechanism though their cause and character are often not fully appreciated. The geometrical elucidation of this subject will be found in a note appended hereto under the heading "Remarks", which also affords a *rationale* of the anchorage method described and exemplified herein.

Figure 1 is a vertical section of part of an engine, an example of the invention, in which two oscillating members are used to anchor an inclined member which has a movement of precession but does not revolve. Fig. 2 shows the oscillating parts and represents a part section on A Fig. 1. Fig. 3 is a view of a central portion of the inclined member. Fig. 4 is a diagram indicative of a modified form of the invention. Figs. 5 and 6 illustrate a modification of the give-and-take element in a construction otherwise as in Fig. 1.

The precessing or "wabbling" member is shown built up in parts, comprising a plate 1 Fig. 1, a lever 1ª attached thereto by a hemispherical shell 1ᵇ and a circular part 1ᶜ screwed into the middle portion of the plate 1 and forming a female track 1ᵈ and spherical cavity 1ᵉ. Fig. 3 shows part of the plate 1 (as viewed axially from the left in Fig. 1) with certain parts removed. Four portions of the plate 1 are cut away, including sections of the thread which holds securely the part 1ᶜ, thus forming openings 1ᶠ. Four rollers 1ᵍ are mounted on studs, such as 1ʰ which are secured to the plate 1, their axes lying in the medial plane 2 and radiating from its center. The male member 3 is co-axial with the body of the apparatus, parts of which, 3ª and 3ᵇ, serve to hold it in due position, but in such a manner that it can freely turn about its axis 3ᶜ if necessary. The member 3 has, formed on its enlarged portion, the male track 3ᵈ and the spherical male surface 3ᵉ respectively adapted to engage with the track 1ᵈ and (in occasional circumstances) with the cavity 1ᵉ.

Two oscillating members 4 and 5 Figs. 1 and 2 have an axis 3ᶜ coincident with the axis of the apparatus and are each secured to portions which form torque rods 4ª and 5ª which have bifurcated ends adapted to hold sliding blocks 4ᵇ and 5ᵇ which embrace respectively eccentrics or crank pins on a minor shaft 6. The minor shaft 6 is held in bearing-blocks which form part of the structure which carries the cylinders of the apparatus. Each oscillating member has a pair of arms on which are formed axially disposed alternative tracks 4ᶜ or 4ᵈ and 5ᶜ or 5ᵈ which engage the before mentioned rollers two of which 1ᵍ appear in Fig. 2 while two others, (see Fig. 3) are disposed at an angle of 90°. The member 3 has an extension 3ᶠ which passes through hollow necks in the oscillating parts 4 and 5 as clearly shown. The central portions of the torque rods 4ª and 5ª form collars loosely held in position on a stationary neck 3ᵍ.

The said central portions also form bases to which the arms of the members 4 and 5 are firmly secured, for example, by bolts such as 4$^e$ screwed into interrupted flanges or lugs such as 4$^f$ 5$^f$ projecting from the arms 4 and 5.

Of the stationary supports of the main shaft 7, one 7$^a$ only is in part shown on the drawing. On the shaft 7 is secured the flywheel 7$^b$ which carries balance weights 7$^c$. The lever 1$^a$ passes through an ample opening 7$^e$ in the flywheel 7$^b$ which latter is directly engaged by its end 1$^i$. The end 1$^i$ may be introduced into a hollow ball 7$^f$ forming a bush suitably mounted in the flywheel 7$^b$.

The member 3 may be axially perforated throughout to form a support for a small accessory shaft 8 (for actuating valves or other purposes) having a crank 8$^a$ which engages a pin 7$^g$ which, at its outer end 7$^h$, may be secured to the flywheel 7$^b$. If the pin 7$^g$ be withdrawn and the shaft 1 with the flywheel 7$^b$ removed in an axial direction the lever 1$^a$ may be freely moved inward, with its depending parts, into a position concentric with the apparatus, in which position, it will be easily understood, the various parts may be conveniently dismantled.

The body of the apparatus (not shown) to the right of Fig. 1, contains the stationary cylinders such as, for example, those of an internal combustion engine. These are grouped circularly about, and parallel with, the axis 3$^c$ as indicated by the connecting rod 9. The minor shaft 6 is rotated by means of any suitable gearing (not shown) in the same direction as the main shaft 7 but at twice the speed of the latter and duly gives and takes the movement imparted to the oscillating members 4 and 5. The two crank pins (referred to herein as eccentrics), having axes marked 6$^a$ and 6$^b$, have an equal throw, the size of which depends on the versed sine of the angle of the precessing member and on the length of the torque rods 4$^a$ and 5$^a$.

In Fig. 2 let the points 6$^a$ and 6$^b$ represent the axes of the two eccentrics of the above named minor shaft, the point 3$^c$ being the common axis of the apparatus. Let the line 6$^b$—3$^c$ equal the radius, the angle 6$^b$—3$^c$—6$^c$ equal the angle of the precessing member; the line 6$^c$—6$^a$ being the sine the line 6$^a$—6$^b$ equals the versed sine which represents the double throw of the eccentric and determines its magnitude.

It will be understood that the piston thrusts, acting upon the member 1, are delivered, by means of the female track 1$^d$ rolling against the male track 3$^d$, thence, by the ball washer 3$^h$ to a part 3$^b$ of the frame or body of the apparatus. The tendency of the precessing member 1 to turn about its axis 1$^i$ is concurrently resisted by the two oscillating members 4 and 5, by reason of the engagement of their four tracks 4$^c$ and 5$^c$ (or, in case of reverse motion, those 4$^d$ and 5$^d$). The angular attitude of the precessing member is determined and maintained by the end 1$^j$ of the lever 1$^a$, resting within its socket 7$^i$ on the flywheel 7$^b$, which, by suitable means not shown, is prevented from moving in an axial direction. The remaining components of the sum of the piston thrusts drive the flywheel 7$^b$ and the shaft 7, while the axis 1$^j$ describes a circular cone, the rotation being theoretically constant and the movement of every reciprocating member being theoretically equal to that of every other like part. Meanwhile the rollers 1$^g$, while restraining the torque, also prevent any transverse movement of the center of the medial plane 2 from its position in the axis 3$^c$ of the apparatus. If, from any reason, the axial thrust on the member 1 should be of a negative character (as when for example the motive fluid is cut off) this is received by the convex spherical surface 3$^e$ from the concave surface 1$^e$. If the four rollers 1$^g$ are exactly 90° apart it follows that the eccentrics' axes 6$^a$ and 6$^b$ must be at double that angle, i. e. 180°.

In the modification Fig. 5 all of the mechanism (including that omitted) which lies to the left of the line B together with the member 3 and its accessory features is to be understood as being precisely similar to that appearing in Fig. 1 but shown mainly in elevation. Fig. 6 is a section on B Fig. 5. The oscillating members 4 and 5 appear in elevation (part of the latter being cut away), likewise the circular part 1$^c$ a portion of which is visible. A small part only of the male member 3 appears, and is supported by a portion 3$^{a\prime}$ of the non-inclined contrary member or body of the apparatus, see Figs. 5 and 6; its extremity to the right is mounted as in Fig. 1. The hollow neck or sleeve 3$^{g\prime}$, shown integral with the portion 3$^{a\prime}$, carries the loosely mounted plates 4$^{a\prime}$ and 5$^{a\prime}$ which are bolted to, and form parts of, the oscillating members 4 and 5 respectively, the bolts being marked 4$^{e\prime}$ and 5$^{e\prime}$. Two perforations 4$^{b\prime}$ are formed in the plate 4$^{a\prime}$ and likewise two 5$^{b\prime}$ in the plate 5$^{a\prime}$. In the portion 3$^{a\prime}$ of the body of the apparatus are formed two openings which are adapted to constitute fulcra for engaging middle enlargements of two balances 6$^\prime$ which have spherical ends 6$^{a\prime}$ and 6$^{b\prime}$ which are fitted accurately into the perforations 4$^{b\prime}$ and 5$^{b\prime}$ respectively. It will be understood that the oscillating members 4 and 5, interacting with the balances 6$^\prime$, are quite free to oscillate under the control exercised by the inclined member through the intermediate members 1$^g$ acting upon the axially disposed tracks 4$^c$ or 4$^d$ and 5$^c$ or 5$^d$ on the oscillating members 4 and 5 as fully described with reference to Figs. 1, 2 and 3; that the balances 6' thus give and take the movements and tangential pressures from the oscillating members, the balances themselves oscillating about a radial axis which lies in the plane of the paper in Fig. 5. The other features, identical with those appearing in Fig. 1, but not here specifically mentioned, have corresponding reference figures; those features which differ but exercise analogous functions, it will be observed, are given distinguishing marks thus, the give-and-take member in Fig. 1 is marked "6," in Figs. 5 and 6 it is marked "6'."

If the mechanism above described be used as in a rotary engine the two contrary members will, of course, rotate (the shaft as 7, etc., see Fig. 1, being stationary) about their (now stationary) axes $1^j$ and $3^c$ respectively, and the oscillations of the members 4 and 5 will be superimposed on the rotary motion, the mechanism thus constituting a universal joint having the (hitherto inherent) errors corrected, i. e. the rotation of the two contrary members synchronized.

Fig. 4 shows a modified form of the invention which may be used as a universal joint. This form differs from that above described mainly in that, instead of two pairs of rollers, the intermediate members consist of a ring and a crosspiece respectively. The several elements have here reference figures corresponding with those in Fig. 1 respectively:—the portions of the contrary members 1 and $3^a$, the intermediate members $1^{gg}$ and $1^g$, the oscillating members 4 and 5 and the give-and-take members 6. The inclined member 1 is of circular section and has pairs of holes drilled radially and centered in the medial plane 2 at 90° apart; one pair, which appear in the drawing, receive one pair of limbs $1^h$ of the crosspiece $1^g$, the other pair of holes (at right angles to the plane of the paper Fig. 4) receive studs held by the gimbal ring $1^{gg}$. The rod 5 at its left end has a bifurcation the extent of which is indicated by the rounded dotted line X. The fork lies within the inclined member 1; it embraces the middle enlargement of the crosspiece $1^g$ and is perforated transversely so as to receive the second pair of shorter limbs, as Y, of the crosspiece $1^g$. The enlarged part Z of the sleeve 4 carries a pair of studs $1^{hh}$ which engage a pair of radial perforations in the gimbal ring $1^{gg}$, as clearly indicated. In the position shown it will be obvious that the studs which form a joint between the ring $1^{gg}$ and the inclined member 1 have momentarily their axis coincident with the axis of the shorter limbs Y of the crosspiece $1^g$. Briefly stated, the sleeve 4 is universally jointed externally to the member 1 through the medium of the ring $1^{gg}$, while the rod 5 is universally jointed internally to the member 1 through the medium of the crosspiece $1^g$. The sleeve 4 ends to the right in a flange $4^a$ while the rod 5 has secured to it a similar flange $5^a$. The member $3^a$ is in two parts secured together and has an inward flange interposing between the flanges $4^a$ and $5^a$ as shown. Axial perforations are drilled through the three flanges, into which are introduced the balances 6 which have three spherical enlargements, the middle ones engaging the flange of the member $3^a$, the ends $6^a$ engaging the flange $4^a$ and the other ends $6^b$ engaging the flange $5^a$, these parts corresponding closely with those of the similar balances in Fig. 5.

The action of the parts will now be understood:—The two contrary members being rotatably mounted in any convenient manner the non-inclined contrary member $3^a$ will rotate about its axis $3^c$, together with the members 4 and 5 which will have their movements of oscillation superimposed on those of rotation, while the inclined member 1, $1^a$ will rotate about its axis $1^j$. Whether the angle of inclination of the axis $1^j$ be constant or otherwise the oscillations of the members 4 and 5 will automatically proportion themselves to the versed sine of the said angle. The enlargements on each of the balances 6 being (as they should be) equally spaced apart the torque will be transmitted in equal shares by the oscillating members 4 and 5 and by the intermediate members, namely, the crosspiece $1^g$ and the ring $1^{gg}$.

Remarks: The present invention is derived from data observed in the examination by the inventor of the nature of the movements in space of a point which lies in the medial plane (above defined) of an acutely inclined bevel wheel which is in motion. The peculiar facts stated below are capable of mathematical demonstration. Let two equal bevel wheels be in mesh having their axes at any acute angle. To remove obscuring complications instead of revolving about their axes in the more usual manner, let one (having a horizontal axis) be fixed and let the other (having the inclined axis) execute a movement of precession, or, in other words, let its axis describe cones. It is clear that the inclined wheel does not thus rotate. Any and every point which lies in the medial plane of the inclined wheel, and in fixed relationship thereto, will be found to describe a curve in space which is the resultant of two simple movements during the period of one precessional movement of the wheel, namely an axially reciprocating movement in simple harmonic motion in relation to the fixed wheel combined with a twice repeated movement in a circle about a stationary horizontal axis. The said curve may be correctly marked on the surface of a sphere or alternatively on that of a cylinder; taking half the diameter of the said sphere as radius the diameter of the said cylinder will equal the versed sine of the angle of inclination of the axis of the inclined wheel. If the angle of inclination be considerable the appearance of the curve, if viewed on the sphere, roughly resembles a figure 8 or the outline of a sand-glass. If the said cylinder be superimposed within the said sphere, so that their two surfaces touch at a point, the line of intersection of the two mathematical bodies equals the said curve.

Let Fig. 1 now be examined in the light of the above remarks; it will be found that the inclined member 1 moves in a manner identical with the bevel wheel above described, and every point in the medial plane 2 will describe a curve as above described. For example, if the axis 6ᵃ of the eccentric or pin be drawn through the medial plane 2 (or its extension) the point of intersection thus found describes twice a circle around the (produced) axis of the minor shaft 6, the radius of the said circle being equal to the throw of the eccentric. Again, every point in the plane 2 which is the center of a ball-and-socket joint will circle (if the parts be suitably coördinated) twice in a revolution about lines which represent the respective axes of the cylinders (not shown); thus each connecting rod (as 9) maintains a constant angle in relation to its cylinder axis. It will be understood as a corollary of the above that the pistons (not shown) must thus move in simple harmonic motion.

I claim:

1. For the purpose of anchoring two contrary members one having its axis inclined to that of the other and taking up axial thrust; a combination comprising a plurality of oscillating members having their axis of oscillation coincident with that of the non-inclined contrary member, means for operative connection of the inclined contrary member with the said oscillating members, a give-and-take element whose opposed parts have means for operative engagement respectively with the said oscillating members, means for mounting the said give-and-take element on the non-inclined contrary member, male and female opposed circular rolling tracks concentrically carried by the said contrary members respectively, a part extending from the non-inclined contrary member through the opening within the female rolling track for supporting the male rolling track, means to enable one of the said rolling tracks to rotate in relation to the contrary member which carries it and means for supporting and coördinating the said contrary members and oscillating members in their angular and axial relationship.

2. For the purpose of anchoring two contrary members one having its axis inclined to that of the other; a combination comprising a plurality of oscillating members having their axis of oscillation coincident with that of the non-inclined contrary member, means for operative connection of the inclined contrary member with the said oscillating members, a give-and-take element whose opposed parts have means for operative engagement respectively with the said oscillating members, means for mounting the said give-and-take element on the non-inclined contrary member, and means for supporting and coördinating the said contrary members and oscillating members in their angular and axial relationship substantially as described.

3. For the purpose of anchoring two contrary members one having its axis inclined to that of the other; a combination comprising intermediate members mounted with axes disposed radially and 90° apart within the medial plane of the inclined contrary member, two oscillating members adapted to engage with the said intermediate members, a balance having ends adapted for interaction respectively with the said oscillating members, a fulcrum for the said balance supported by the non-inclined contrary member and means for supporting and coördinating the said contrary members and oscillating members in their angular and axial relationship substantially as described.

4. In a machine of the order having two contrary members one with its axis inclined to that of the other and having axially reciprocating elements (as pistons, etc.) in connection with the inclined contrary member; for the purpose of taking up axial thrust a combination comprising male and female opposed rolling tracks concentrically carried by the said contrary members respectively, a part extending through the opening within the female track for supporting the male track, and means for anchoring the said contrary members.

5. In a machine of the order having two contrary members one with its axis inclined to that of the other and having axially reciprocating elements (as pistons, etc.) in connection with the inclined contrary member; for the purpose of taking up axial thrust, a combination comprising opposed rolling tracks concentrically carried by the said contrary members respectively, means for enabling one of the said tracks to rotate in relation to the contrary member which carries it, means for anchoring the said contrary members.

6. In a machine of the order having two contrary members one with its axis inclined to that of the other and having axially reciprocating elements (as pistons, etc.) in connection with the inclined contrary member; for the purpose of anchoring the said contrary members a combination comprising two pairs of rollers mounted with their axes disposed radially 90° apart and within the medial plane of the inclined contrary member, two oscillating members carrying axially disposed pairs of tracks for engaging respectively with the said pairs of rollers and having a plurality of axial perforations, a plurality of balances having rounded ends for operating within the said perforations, fulcra for the said balances carried by the non-inclined contrary member, and means for taking up axial thrust.

CHARLES LESLIE WALKER.

Witnesses:
ALFRED FREDERICK TROWLES,
HELEN ELIZABETH TROWLES.